May 22, 1956     J. G. KIRKWOOD ET AL     2,747,009
STABLE VOLTAIC CELLS

Filed Jan. 20, 1954     3 Sheets-Sheet 2

INVENTORS
JOHN G. KIRKWOOD
FRED W. WEST
BY G. H. Palmer
Ernest Cheslow
ATTORNEYS May 22, 1956     J. G. KIRKWOOD ET AL     2,747,009
STABLE VOLTAIC CELLS
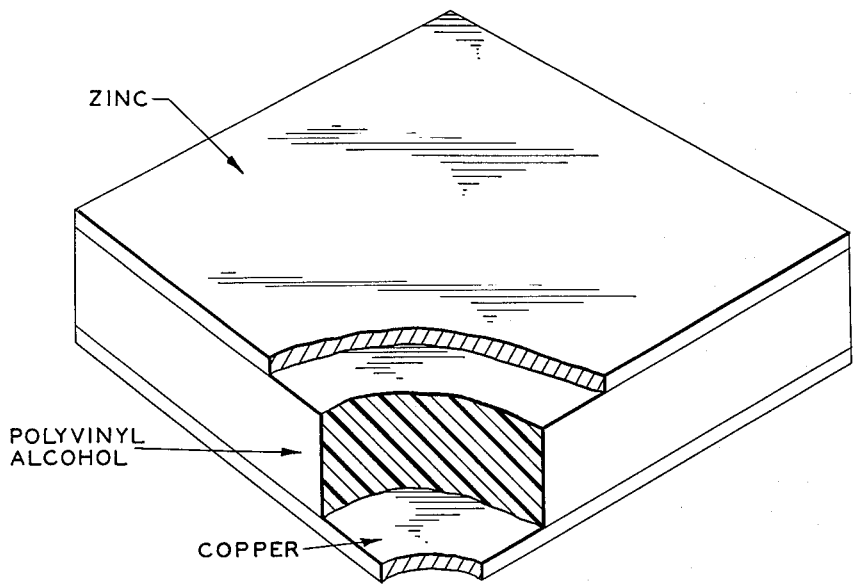

United States Patent Office 2,747,009
Patented May 22, 1956

2,747,009

STABLE VOLTAIC CELLS

John G. Kirkwood, Guilford, Conn., and Fred William West, Ridgefield, N. J., assignors to The M. W. Kellogg Company, Jersey City, N. J., a corporation of Delaware Application January 20, 1954, Serial No. 405,197

16 Claims. (Cl. 136—103)

This invention relates to the production of essentially dry voltaic cells and, in particular, to the production of voltaic cells containing conductive resinous matrixes containing less than about 20 per cent and preferably less than about 10 per cent of moisture.

Primary voltaic cells are well-known in the art and, in general, comprise electrodes at different potentials and particularly electrodes of two dissimilar metals separated by an aqueous electrolyte solution. Among the most useful of the voltaic cells is the so-called "dry cell," wherein the aqueous solution is soaked up into some kind of a matrix or gel and the unit is sealed.

The so-called "dry cell" is advantageous over other voltaic cells in that it is convenient to handle and non-spillable. The so-called "dry cell," however, contains a great deal of water which would rapidly be lost if the unit were not sealed. This makes it necessary to use sealed containers and greatly increases the bulk and the weight of the primary cells. The form of the cell is also usually limited to cylindrical shapes.

It has now been found that essentially dry voltaic cells can be made by using a conductive resinous composition containing ions of an electrolyte to separate the two electrodes and that such compositions may contain less than about 10 per cent of moisture. These resinous compositions are dry to the touch and will retain indefinitely their ability to permit ion migration. Such resinous compositions need not be sealed since they cannot spill and they are not harmed by exposure to air.

The electrodes in this invention are usually metallic and preferably dissimilar, although concentration cells wherein both electrodes are composed of the same metal can be made, as described below. Any two metals having different positions in the electromotive series may be used and for high voltage preferably metals which are far removed from each other in their positions in the electromotive series. Since lightness and small volume are among the advantages of the primary cells of this invention, it is advantageous to use metals which are readily available in foil form. Among the pairs of dissimilar metals which may be used are zinc and copper, aluminum and copper, zinc and silver, aluminum and silver, zinc and lead, aluminum and lead, zinc and tin, and aluminum and tin.

If desired, however, similar electrodes may be used and the difference in potential obtained by difference in concentration and/or composition of the electrolyte in the immediate vicinity of each electrode. By the use of the resinous matrixes of this invention such differences in the concentration and/or the composition of the electrolyte may be maintained without the use of porous diaphragms.

The resinous matrix used in the cell should have the following properties: (1) the ability to dissolve ionized metallic salts; (2) a structure such that ions can move through the matrix freely enough to carry a modest current; and (3) strength and toughness sufficient to hold the cell together in a form that can be handled.

In general, the polymeric matrix includes an electrolytic liquid in small concentration. The electrolytic liquid should be one which is a swelling agent for the resin, and is generally a solution of an electrolyte in a small amount of polar solvent which is a swelling agent for the resin. In order to maintain stability in the matrix, the proportion of polar solvent should be less than about 20 per cent and preferably less than about 10 per cent by weight of the matrix. Among the polar solvents which may be used in accordance with this invention are: water, ammonia, amines, glycols, glycerine and mixtures thereof. Water is the preferred polar solvent.

The resin used in this invention is one which is swellable in the solvent for the electrolyte. Ordinarily, a polymer electrolyte such as a polymeric carboxylic acid, is used. Among the specific polymeric carboxylic acids and salts which may be used are: polyacrylic acid, polymethacrylic acids and their salts, styrene-maleic anhydride resins, vinyl ether-maleic anhydride resins, and carboxymethyl cellulose.

Polymeric materials other than polymeric carboxylic acids may also be used as matrixes and particularly other polymeric materials having polar properties. Among these other matrixes are: polyvinyl alcohol, polyvinyl pyrrolidone, polyvinyl pyridine, polyacrylamid, polyvinyl phthalimid, methyl cellulose, hydroxy methyl celluose, gelatin, albumen, gum arabic, casein, dimethyl hydantoin-formaldehyde and phenol-formaldehyde. It is to be noted that the term "polymeric material" as used herein includes naturally occurring macro molecules, not necessarily produced by polymerization. In general, any polymer containing polar groups in its structure is capable of absorbing and setting in an electrolytic liquid. Among the polar groups which may be present in the polymeric materials of this invention are: hydroxyl groups, carboxylic groups, amine groups, carbonyl groups, ether groups, sulfonyl groups and hydrophilic groups in general.

As stated above, the electrolytic liquid is ordinarily a solution of an ionizable salt, acid or base in a polar solvent, such as water. Any ionizable compound which is soluble in the polar solvent may be used. When water is the polar solvent, it is preferred to use, adjacent to each electrode, an ionizable water-soluble salt of the metal of the electrode. For example, with a zinc electrode, zinc chloride or zinc sulphate may comprise the ionizable salt; with a copper electrode, cupric chloride or cupric sulphate may comprise the ionizable salt.

Alkaline cells, using, for example, potassium or sodium hydroxide as the ionizable compound and acid cells, using dilute mineral acids, are also contemplated in this invention.

If desired, the polymeric matrix may contain materials other than the polar solvent, the ionizable salt and the polymer itself. For example, if desired, a plasticizer for the polymer may be included. The preferred plasticizers are glycerol and ethylene glycol, which, as stated above, also act as polar solvents. Also, if desired, a depolarizer may be used.

In the drawings Fig. 1 represents graphically the load characteristics of a Cu/polyvinyl alcohol/Zn cell;

Fig. 3 represents schematically said cell, partly in section.

Example 1

Zinc and copper sheets were coated with a water solution of a partial sodium salt of polyacrylic acid and dried at 70° C. These coated sheets were then soaked in 10 per cent solutions of zinc chloride and copper chloride, respectively, to swell the coatings. Because the films on redrying at 70° C. were very brittle, they were coated with small amounts of glycerol and heated to effect plasticization. The coated panels were placed face-to-face and pressed at 70° C. under 500 p. s. i. The potential measured across the resultant cell by a vacuum tube voltmeter was 0.9 volt.

*Example 2*

A water solution of $CuCl_2$, mixed with a water-alcohol solution of polyvinyl alcohol and glycerol, was spread on a sheet of metallic copper and dried. The resultant film was approximately 0.001" thick and its $CuCl_2$ contration was about 1 M. A similar film, containing zinc chloride in 1 M concentration, was deposited on a sheet of metallic zinc.

The coated metal sheets were laminated face-to-face at 70° C. under 500 p. s. i. The potential across this cell was 1.15 volts.

*Example 3*

A concentration type cell was prepared in which both metlalic surfaces were .0015" aluminum foil. Two solutions of polyvinyl alcohol and glycerine, one containing 0.17M $AlCl_3$ on a dry basis and the other 17M $AlCl_3$, were deposited on two pieces of aluminum foil and dried to yield coatings approximately 0.001" thick. The two coated pieces of foil were then laminated face-to-face at 70° C. under 500 p. s. i. The potential across this cell was 0.15 volt.

*Example 4*

Figure 1:
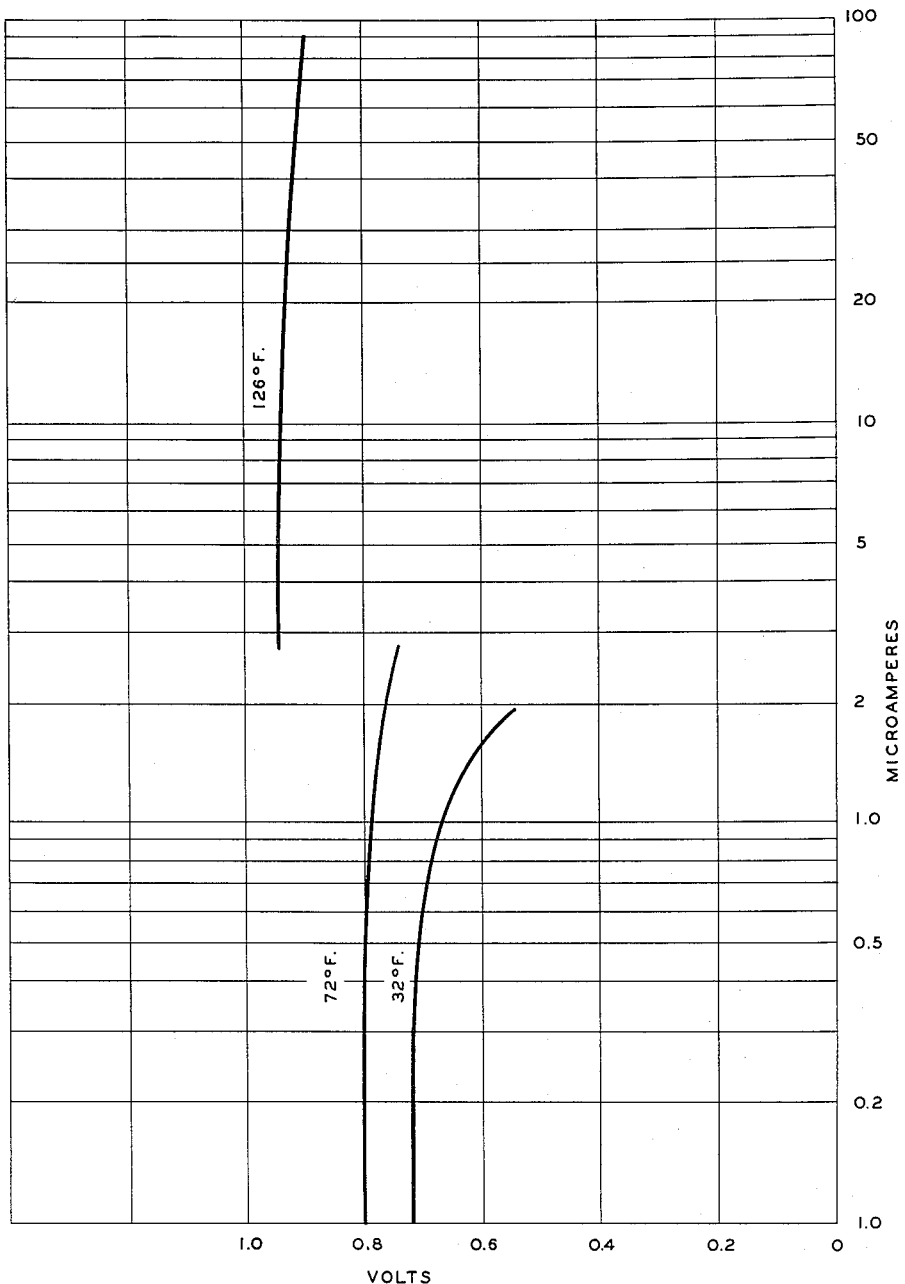

A solution was prepared containing 8 parts by weight of polyvinyl alcohol, 2 parts by weight of ethylene glycol and 1 part by weight of cupric sulfate dissolved in 90 parts by weight of a 50–50 water-alcohol solution. A similar solution was prepared substituting 1 part by weight of zinc chloride for the cupric sulfate. The cupric sulfate solution was applied in 2 coats to a rectangular sheet of copper about 1/16" thick. The zinc chloride solution was applied in 2 coats to a rectangular sheet of zinc about 1/16" thick. The coated metal rectangles were dried and laminated at 200° F. at about 1000 p. s. i. The metal rectangles overlapped over an area of about 3" square and extended on opposite sides from this overlap area to provide a means for connecting conductors. This cell was tested to determine its load characteristics at 3 different temperatures, 32° F., 72° F. and 126° F. They were tested by measuring the voltage at no load and at loads varied by the substitution of resistors calibrated at 10 megohms, 3.3 megohms, 1 megohm and 330,000 ohms. The results of this test are plotted semi-logarithmically in Figure 1.

Figure 2:
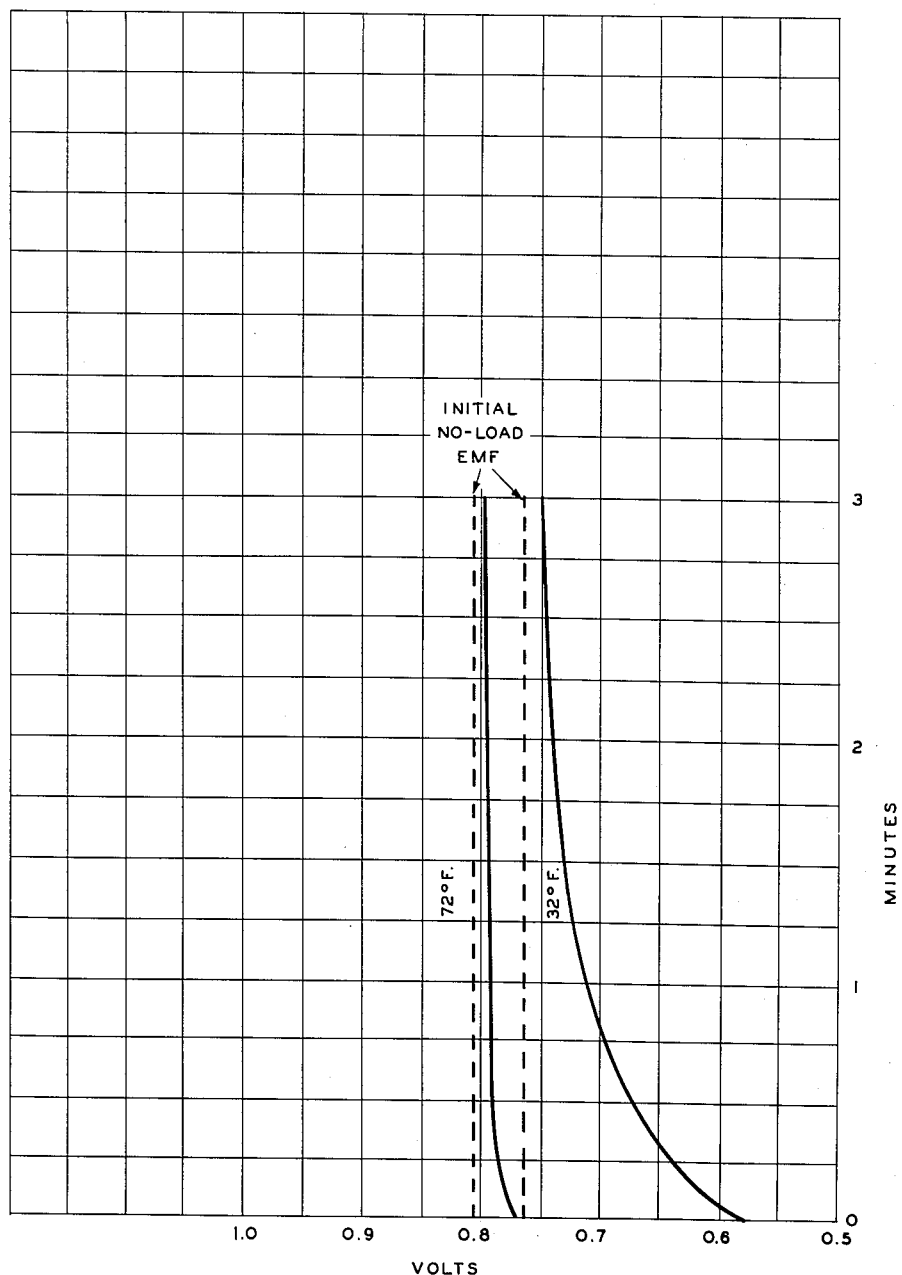
Fig. 2 represents graphically the voltage recovery rates of said cell.

This cell was also tested to determine its voltage recovery rate at 32° F. and 72° F. This test test was run by draining the cell through a 330,000 ohm resistor for a period of about 5–10 minutes until the voltage was stable and then removing the resistor and measuring the rise in voltage at successive intervals of time. The results of this test are shown in Figure 2 of the drawings.

Figure 3 of the drawings shows a single cell, partly in section, made up of a zinc sheet, a copper sheet, and a polymeric matrix, such as polyvinyl alcohol, containing an ionizable water-soluble metal salt, such as zinc chloride or copper sulfate, and less than about 10% of moisture. It is to be understood that the drawing is schematic and that the relative thicknesses of the respective layers are not necessarily those shown in the drawing.

A single cell of limited area, such as those of the above examples, has a low current capacity but good stability and aging characteristics. Current capacity may be increased by increasing the area. A very long laminate of metal foils may be rolled in a manner similar to that used in the fabrication of paper condensers and thereby produce a light weight, small volume cell having a large area and increased current capacity. If desired, the voltage of the primary cells may be increased by the fabrication of a multi-cell battery. Alternate layers of dissimilar metal foils may be laminated with the conductive polymeric matrix sandwiched between them. For physical strength and for ease of connecting conductors, it is preferred that the outside electrodes be made of sheet metal rather than foil. In this manner, a light weight and small volume battery, of high voltage but low current capacity, may be prepared. The laminated cells and batteries produced in accordance with this invention have, in their polymeric matrixes, a moisture content which is low enough to be stable, and which is consistent with toughness and dryness to the touch in the matrixes. The small exposed area of polymeric matrix between the metallic sheets need not be sealed for stability. If desired, however, a thin film of shellac or other protective coating may be applied.

We claim:

1. An essentially dry voltaic cell comprising a pair of electrodes at different potentials separated by a polymeric matrix containing ions of an electrolyte and less than about 10 per cent of moisture.

2. An essentially dry voltaic cell comprising a pair of dissimilar metal electrodes separated by a polymeric matrix containing ions of an electrolyte and less than about 10 per cent of moisture.

3. An essentially dry voltaic cell comprising a pair of dissimilar metal electrodes separated by a polymeric matrix containing less than about 10 per cent of moisture and having incorporated therein an ionized metal salt.

4. An essentially dry voltaic cell comprising a pair of dissimilar metal electrodes separated by a polyacrylic acid matrix containing less than about 10 per cent of moisture and having incorporated therein an ionized metal salt.

5. An essentially dry voltaic cell comprising a sheet of copper and a sheet of zinc separated by a polyacrylic acid matrix containing less than about 10 per cent of moisture and having incorporated therein an ionized metal salt.

6. An essentially dry voltaic cell comprising a sheet of copper and a sheet of zinc separated by a polyacrylic acid matrix containing copper ions, zinc ions and chloride ions, and less than about 10 per cent of moisture.

7. An essentially dry voltaic cell comprising a conductive resinous composition sandwiched between two sheets of dissimilar metals, said composition comprising a polymeric matrix, ions of an electrolyte and less than about 10 per cent of moisture.

8. An essentially dry voltaic battery comprising a conductive resinous composition sandwiched between a plurality of sheets of alternating dissimilar metals, said composition comprising a polymeric matrix, ions of an electrolyte and less than about 10 per cent of moisture.

9. An essentially dry voltaic cell prepared by coating sheets of two dissimilar metals with solid polymeric films, soaking each film in an aqueous solution of an ionizable salt of the metal on which it is coated, drying each film to a moisture content of less than about 10 per cent by weight and compressing the sheets together with coated surfaces in contact to produce a laminate.

10. An essentially dry voltaic battery prepared by coating a metal sheet with an aqueous solution comprising an ionizable salt of the metal of the sheet and a water soluble resinous polymer, drying said solution to produce a poylmeric film containing less than about 10 per cent of moisture by weight, coating a sheet of a dissimilar second metal with a water solution of an ionizable salt of said second metal containing said water soluble resinous polymer, drying said solution to produce a polymeric film containing less than about 10 per cent of moisture by weight, compressing said coated metal sheets with coated surfaces in contact to produce a laminate.

11. An essentially dry voltaic cell comprising a sheet of copper and a sheet of zinc separated by a polyvinyl alcohol matrix containing copper ions, zinc ions and chloride ions, and less than about 10 per cent of moisture.

12. The dry voltaic cell of claim 9 which contains, in addition, glycerol as plasticizer.

13. The dry voltaic cell of claim 9 which contains, in addition, an ethylene glycol as plasticizer.

14. An essentially dry voltaic cell comprising a pair of dissimilar metal electrodes separated by a polymeric matrix containing less than about 10 per cent of moisture and comprising a polymer having polar properties and an ionizable, water-soluble metal salt.

15. An essentially dry voltaic cell prepared by coating a metal sheet with a polymer having polar properties, coating a sheet of a second metal with the same polymer, soaking each of the coated metal sheets in an aqueous solution comprising an ionizable salt of the metal of the sheet to swell the coatings, drying said coating to a moisture concentration of less than about 10 per cent by weight, and compressing said coated metal sheets with coated surfaces in contact to produce a laminated cell.

16. An essentially dry voltaic cell comprising a pair of similar metal electrodes separated by polymeric matrix containing less than about 10 per cent of moisture and having incorporated therein an ionized metal salt, said salt being present in said matrix in a high concentration in the vicinity of one of said electrodes and in a lower concentration in the vicinity of the other of said electrodes.

References Cited in the file of this patent

UNITED STATES PATENTS

| | | |
|---|---|---|
| 2,607,809 | Pitzer | Aug. 19, 1952 |
| 2,636,851 | Juda | Apr. 28, 1953 |
| 2,647,938 | Taylor | Aug. 4, 1953 |
| 2,648,717 | Ross et al. | Aug. 11, 1953 |